(12) United States Patent
Choudhury et al.

(10) Patent No.: US 9,070,977 B2
(45) Date of Patent: *Jun. 30, 2015

(54) WIRELESS ANTENNA ARRAY SYSTEM ARCHITECTURE AND METHODS TO ACHIEVE 3D BEAM COVERAGE

(75) Inventors: Debabani Choudhury, Thousand Oaks, CA (US); Richard D. Roberts, Hillsboro, OR (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/888,645

(22) Filed: Sep. 23, 2010

(65) Prior Publication Data

US 2011/0014878 A1    Jan. 20, 2011

Related U.S. Application Data

(63) Continuation of application No. 12/215,542, filed on Jun. 27, 2008, now Pat. No. 7,830,312.

(60) Provisional application No. 61/035,480, filed on Mar. 11, 2008.

(51) Int. Cl.
| | |
|---|---|
| *H01Q 3/26* | (2006.01) |
| *H01Q 21/24* | (2006.01) |
| *H04B 7/06* | (2006.01) |

(52) U.S. Cl.
CPC .............. *H01Q 3/26* (2013.01); *H01Q 21/24* (2013.01); *H04B 7/0682* (2013.01)

(58) Field of Classification Search
CPC .......... H01Q 1/38; H01Q 3/26; H01Q 21/24; H04B 1/38; H04B 7/0682
USPC .................. 343/700 MS, 725, 727, 729, 730
See application file for complete search history.

(56) References Cited

U.S. PATENT DOCUMENTS

| | | | | |
|---|---|---|---|---|
| 5,262,791 | A * | 11/1993 | Tsuda et al. | 343/700 MS |
| 6,008,770 | A * | 12/1999 | Sugawara | 343/767 |
| 6,037,911 | A * | 3/2000 | Brankovic et al. | 343/795 |
| 6,396,449 | B1 * | 5/2002 | Osterhues et al. | 343/754 |
| 7,126,541 | B2 * | 10/2006 | Mohamadi | 343/700 MS |
| 7,468,698 | B2 * | 12/2008 | Fujii et al. | 343/700 MS |
| 7,692,590 | B2 * | 4/2010 | Floyd et al. | 343/700 MS |
| 8,018,384 | B2 * | 9/2011 | Floyd et al. | 343/700 MS |

FOREIGN PATENT DOCUMENTS

| | | |
|---|---|---|
| JP | 2008503904 A | 2/2008 |
| KR | 20020041700 A | 6/2002 |

OTHER PUBLICATIONS

Office Action received for Korean Patent Application No. 2010-7019908, mailed on Sep. 30, 2011, 8 pages of English Translation only.

\* cited by examiner

*Primary Examiner* — Hoang V Nguyen
(74) *Attorney, Agent, or Firm* — Forefront IP Lawgroup, PLLC

(57) ABSTRACT

Embodiments of wireless antenna array systems to achieve three-dimensional beam coverage are described herein. Other embodiments may be described and claimed.

20 Claims, 4 Drawing Sheets

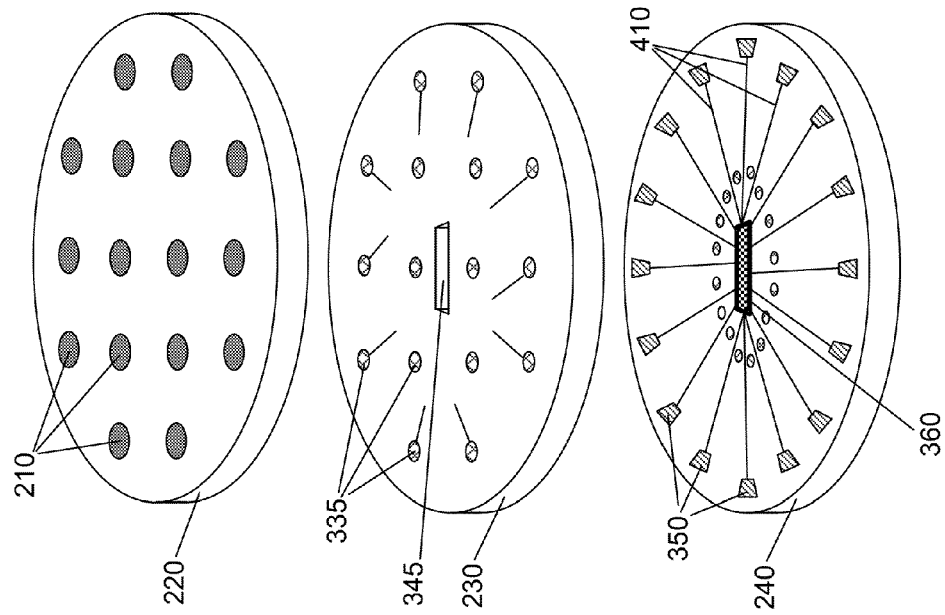
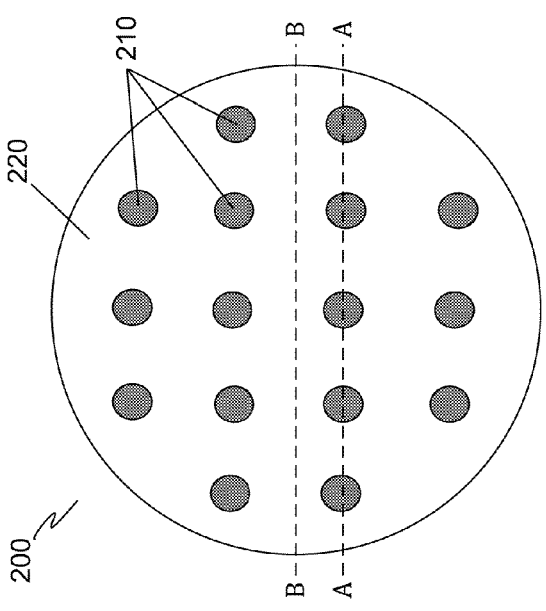
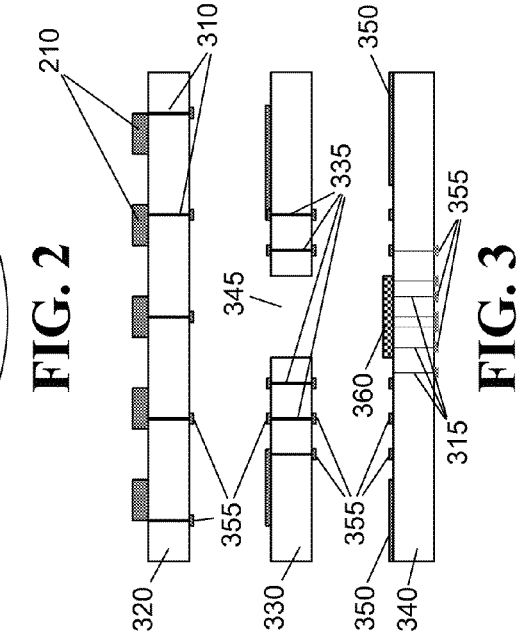

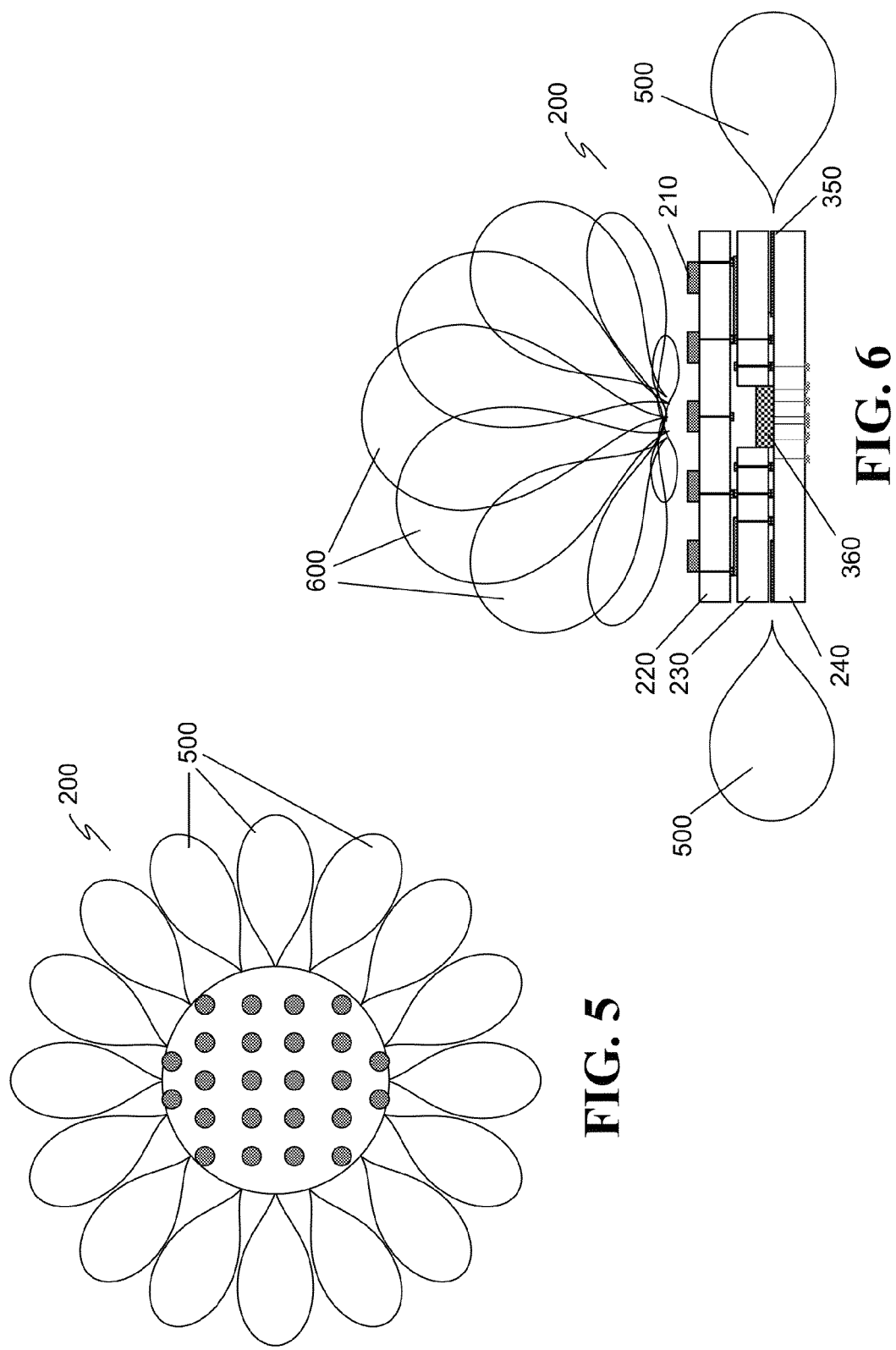

WIRELESS ANTENNA ARRAY SYSTEM ARCHITECTURE AND METHODS TO ACHIEVE 3D BEAM COVERAGE

REFERENCE TO RELATED INVENTIONS

The present application claims priority to U.S. patent application Ser. No. 12/215,542 titled "Wireless Antenna Array System Architecture and Methods to Achieve 3D Beam Coverage" filed Jun. 27, 2008, the entire disclosure of which is hereby incorporated by reference in its entirety.

FIELD OF THE INVENTION

The field of invention relates generally to a wireless antenna array system and more specifically but not exclusively relates to a wireless system architecture for transmitting and receiving millimeter-wave (mm-wave) signals in WPAN/WLAN environments.

BACKGROUND INFORMATION

Technological developments permit digitization and compression of large amounts of voice, video, imaging, and data information. The need to transfer data between devices in wireless mobile radio communication requires reception of an accurate data stream at a high data rate. It would be advantageous to provide antennas that allow radios to handle the increased capacity while providing an improved quality that achieves antenna coverage in both azimuth and elevation. It would also be advantageous to provide mobile internet devices and/or access points with a smaller form factor that incorporates integrated, compact, high performance antennas.

BRIEF DESCRIPTION OF THE DRAWINGS

The present invention is illustrated by way of example and not as a limitation in the figures of the accompanying drawings, in which:

FIG. 2 is a top view of a wireless antenna array assembly to achieve three-dimensional (3D) beam coverage using extremely high frequency radio signals in accordance with some embodiments of the present invention.

FIG. 3 is a cross-sectional illustration of the wireless antenna array assembly of FIG. 2.

FIG. 4 is an isometric drawing of the wireless antenna array assembly of FIG. 2.

FIG. 5 is an illustration of azimuth beam coverage of a wireless antenna array assembly in accordance with some embodiments of the present invention.

FIG. 6 is an illustration of elevation beam coverage of a wireless antenna array assembly in accordance with some embodiments of the present invention.

DETAILED DESCRIPTION

Figure 1:
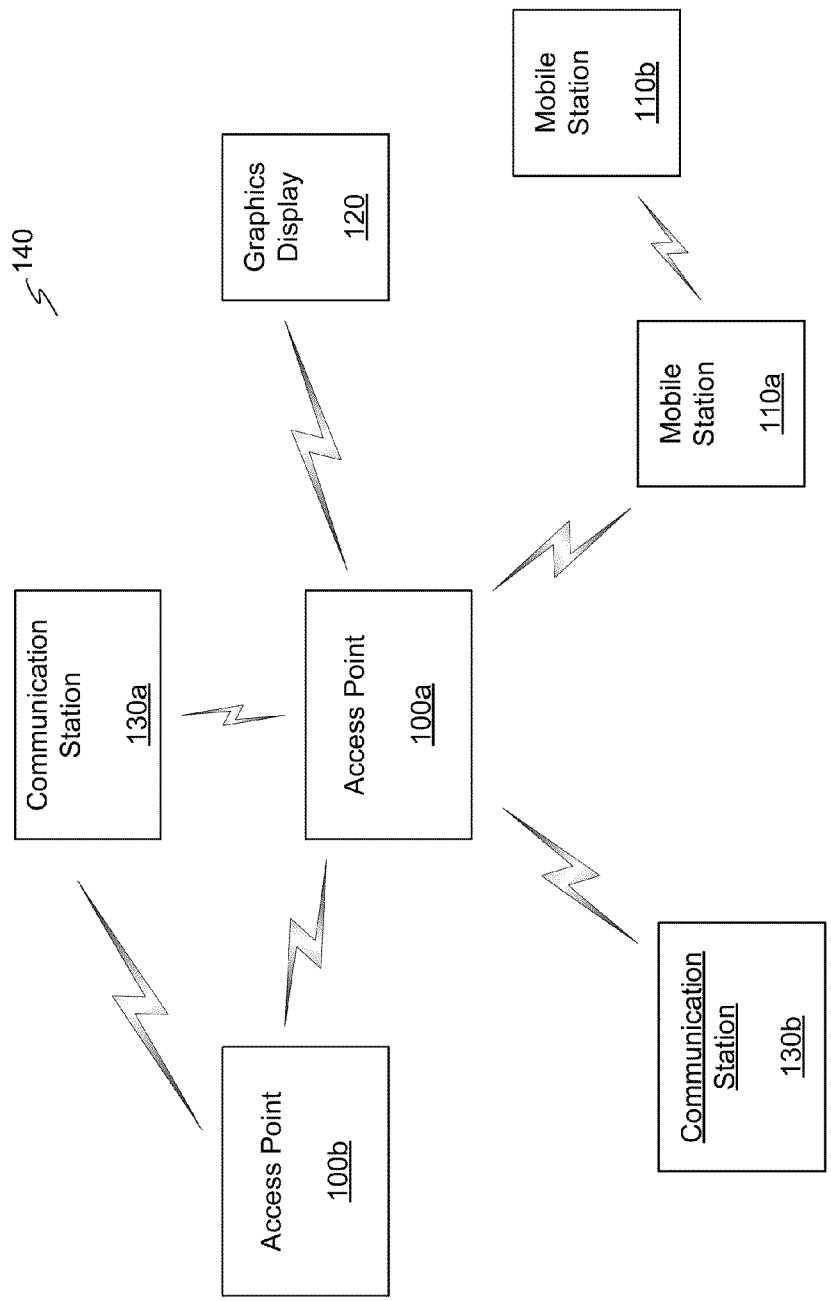
FIG. 1 is a block diagram illustrating devices using extremely high frequency radio signals to communicate in a wireless network.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of methods and systems for using wireless antenna array system architecture to achieve three-dimensional (3D) beam coverage are described herein. In the following description, numerous specific details are set forth such as a description of an arrangement of phased and sectorized antenna arrays for achieving antenna coverage in both azimuth and elevation to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

It would be an advance in the art to increase coverage for low cost millimeter wave (mm-wave) wireless devices designed to operate using local area network (WLAN) and wireless personal area network (WPAN) technologies. MM-wave communication is desirable for relatively high communications throughput while providing high frequency reuse potential. Existing mm-wave communication techniques and systems that employ beam-steered or phased array antennas fail to provide a compact low cost solution for devices that communicate using extremely high frequency radio signals in both azimuth and elevation. Antennas designed to communicate using extremely high frequency radio signals with small wavelengths may be designed using modest sized packages due to a small beam width, allowing for compact antenna array architecture. Providing a low cost and compact antenna array capable of operating using extremely high frequency radio signals, for example an unlicensed short range frequency band with data throughputs up to 2.5 gigabit per second, in both azimuth and elevation, would enable more efficient form factor design of access point or consumer devices while providing increased operability in a variety of applications. As a result, directional limiting communication capability inherent to existing antenna types are avoided and access points or devices employing extremely high frequency radio signals in a high bandwidth wireless communication environment may enjoy multidirectional wireless coverage from a low-cost, yet compact antenna array system.

Embodiments of 60 GHz band ((57-66 GHz) millimeter-wave (mm-wave) communications devices may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a set-top box, a handheld computer, a handheld device, a Personal Digital Assistant (PDA) device, a handheld PDA device, a mobile station (MS), a graphics display, a communication station, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Turning now to the figures, FIG. 1 is a block diagram illustrating devices, such as access points (100*a* & 100*b*), mobile stations (110*a* & 110*b*), a graphics display (120) and communication stations (130*a* & 130*b*) using extremely high frequency radio signals to communicate in an extremely high frequency wireless network 140. Access point 100*a* may communicate with another access point 100*b* and communication stations, such as communication stations (CS) 130*a* and 130*b*. The CSs 130*a* and 130*b* may be fixed or substantially fixed devices. In some embodiments, access points 100*a* may use millimeter-wave signals for communicating, although the scope of the invention is not limited in this respect. Access point 100*a* may also communicate with other devices such as mobile station 110*a* and graphics display 120. In some embodiments, access point 100*a* and mobile station 110*a* operate as part of a peer-to-peer (P2P) network. In other embodiments access point 100*a* and mobile station 110*a* operate as part of a mesh network, in which communications may include packets routed on behalf of other wireless devices of the mesh network, such as mobile station 110*b*. Fixed wireless access, wireless local area networks, wireless personal area networks, portable multimedia streaming, and localized networks such as an in-vehicle networks, are some examples of applicable P2P and mesh networks.

Devices such as the access points (100*a* & 100*b*), mobile stations (110*a* & 110*b*), graphics display (120) and communication stations (130*a* & 130*b*) may communicate using extremely high frequency radio signals transmitted and received through a combination sectorized and phased wireless antenna array assembly. FIG. 2 is a top view of a wireless antenna array assembly 200 to achieve three-dimensional (3D) beam coverage using extremely high frequency radio signals in accordance with some embodiments of the present invention.

One or more planar antennas 210 may be affixed to a surface of a first substrate 220 and configured to form a planar antenna array, which combined with two or more substrates including second substrate 230 (see FIG. 4) and third substrate 240 (see FIG. 4) comprise the wireless antenna array assembly 200. One or more planar antennas 210 may be dipole, patch, slot or any other type of mm-wave antenna elements. The first substrate 220, second substrate 230, and third substrate 240 (hereinafter, 'the substrates') are selected to be compatible in mm-wave applications. Planar antennas 210 may be used because of their low profile, low cost, light weight, and their ease of integration into planar arrays.

The substrates may be selected from the group comprising Low Temperature Co-fired Ceramic (LTCC), alumina ($Al_2O_3$), antenna grade core materials and laminates such as Rogers Corp. RO™ series, duroid, liquid crystal polymer (LCP), high-resistivity silicon or one or more other suitable substrates for mm-wave applications. The substrates may be shaped in any variety of shapes and sizes, for example, substantially between 1 to 50 centimeters (cm) width and substantially between 50 µm and 1200 µm in thickness. In one embodiment, the substrates are all one shape, size, and thickness. Alternately, the substrates may be selectively designed to differ in shape, size, and or thickness depending on application and how the wireless antenna array assembly 200 is designed and developed.

The first substrate 220 may be planar or substantially planar to provide a platform to affix a phased array of planar antennas 210. The planar antennas 210 may be configured in a rectangular, dithered, randomized, or any combinations thereof to achieve a desired elevation beam coverage. A phased array is a group of antennas in which the relative phases of the respective signals feeding the planar antennas 210 are varied in such a way that an effective radiation pattern of the planar-phased array is reinforced in a desired direction and suppressed in undesired directions. A planar array is a group of antennas in which all of the elements are in, or are substantially in one plane. In this embodiment, the planar-phased array of antennas provide elevation beam coverage from the first substrate 220.

Each planar antenna 210 comprises a conductive sheet selectively designed to transmit and receive wireless signals and may be formed directly on the first substrate 220. A design of each planar antenna 210 may be developed by defining metal patterns on the substrates. In another embodiment, each planar antenna 210 is formed on an intermediate substrate which is affixed to the first substrate 220. Each planar antenna 210 may be a patch, slot, spiral, or any other suitable antenna structure to provide elevation beam coverage. One or more different types of planar antennas 210 may be used to form an array on the first substrate 220.

FIG. 3 is a cross-sectional illustration of the wireless antenna array assembly 200 of FIG. 2. The first substrate cross-section 320 is a cross-sectional view of the first substrate 220 through section line A-A. Planar antennas 210 on the first substrate 220 are coupled to the second substrate 230 through a plurality of vias 310. In one embodiment, the vias 310 are formed of a conductive material such as copper (Cu), gold (Au), or another suitable conductive material and routed through the first substrate 220 through one or more channels or vias to provide radio frequency signals through the first substrate 220. In another embodiment, the vias 310 are selectively designed to provide efficient mm-wave interconnect routing using shielded stripline or microstrip type transmission structures. A stripline is an electrical transmission line used to convey extremely high frequency radio signals and is formed of a conductive material, for example one or more metals such as copper (Cu) or gold (Au), sandwiched between two ground elements such as ground planes (not shown). A microstrip is an alternate type of electrical transmission line. The microstrip is a conductive material formed on a dielectric layer that separates the microstrip from a ground element such as a ground plane (not shown).

A second substrate cross-section 330 is a cross-sectional view of the second substrate 230 through section line B-B.

The second substrate 230 is an interface structure to provide interconnect routing between the first substrate 220 and the third substrate 240 through one or more interconnects 335 while providing a recess 345 for one or more raised features on substrate 240.

A third substrate cross-section 340 is a cross-sectional view of the third substrate 240 through section line B-B. A plurality of endfire antennas 350, such as quasi-Yagi-Uda, planar slot, and other related antenna patterns provide a sectorized endfire antenna array on the third substrate 240. One or more different types of endfire antennas 350 may be used to form an array on the third substrate 240.

An integrated circuit (IC) 360 connected to the third substrate 240, using a flip-chip process or another chip attachment process known to one skilled in the art, may be formed from group III-V semiconductor technology such as Gallium Arsenide (GaAs) and Indium Phosphide (InP). Alternately, the IC 360 may be formed from Silicon Germanium (SiGe), Heterojunction Bipolar Transistor (HBT), bipolar junction transistors combined with complimentary metal-oxide semiconductor (BiCMOS), and silicon technology such as complimentary metal-oxide semiconductor (CMOS). CMOS technology provides low cost and highly integrated solutions, whereby RF building blocks, active and passive elements are integrated on the same chip, as compared to other available technologies.

One IC 360 is illustrated in this embodiment, however a plurality of ICs 360 may be used in the wireless antenna array assembly 200. The IC 360 is coupled to the endfire antennas 350 to provide sectorized array coverage and coupled to the planar antennas 210 through interconnects 335 and 310 to provide phased array coverage by the wireless antenna array assembly 200. The interconnects 335 may carry radio frequency (RF) signals from the first substrate 220, through metal-vias 310, metal bumps 355 and metal-vias 335, to the third substrate 240. Further, the IC 360 may be coupled to backend circuits and processor inputs through vias 315 and metal bumps 355 formed in and on the third substrate 240 using direct current (DC) and low frequency signals. The IC 360 may also be connected to the endfire antennas 350 using a plurality of microfeed lines 410. The microfeed lines 410 may be one or more patterned metal layers on a substrate, such as the third substrate 240 of FIG. 4. Additionally, the microfeed lines 410 may be formed on more than one substrate layer to connect the integrated circuit 360, planar antennas 210, and endfire antennas 350 in the wireless antenna array assembly 200.

FIG. 4 is an isometric drawing of the wireless antenna array assembly 200 of FIG. 2 illustrating the first substrate 220 with the planar antennas 210 in a phased array to provide elevation coverage. The second substrate 230 provides a plurality of interconnects 335 to connect the first substrate 220 to the third substrate 240. The third substrate 240 with the integrated circuit 360 and the endfire antennas 350 in a sectorized array provides azimuth coverage.

In one embodiment, the integrated circuit 360 may include a mm-wave transceiver for processing signals received by the endfire antennas 350 and/or the planar phased-array antennas 210 and for generating mm-wave signals for transmission by the endfire antennas 350 and/or the planar broadside antennas 210. The integrated circuit 360 may also include processing circuitry which may configure the endfire antennas 350 and/or the planar phased array antenna elements 210 for receiving and/or transmitting in a selected direction. The processing circuitry may also identify directions for communicating with other wireless devices, rank the directions based on signal levels, and coordinate the directional communications with another wireless device in one of the selected directions.

Three substrates are illustrated in this embodiment, however other antenna array assembly configurations may be selectively designed with additional substrates and antennas depending on application and beam coverage requirements. The endfire antennas 350 may be configured in a rectangular, circular, or any other shape to achieve a desired azimuth beam coverage.

FIG. 5 depicts the wireless antenna array assembly 200 of FIG. 2 while illustrating azimuth beam coverage from a plurality of azimuth beams 500, in accordance with some embodiments of the invention. In this embodiment, the wireless antenna array assembly 200 is configured to provide complete azimuth beam coverage in a circular design across 360 degrees. In another embodiment, the wireless antenna array assembly is configured in a rectangular design to achieve a desired azimuth beam coverage, though the embodiment is not so limited.

FIG. 6 depicts the wireless antenna array assembly 200 of FIG. 2 while illustrating azimuth and elevation beam coverage from a plurality of azimuth beams 500 and a plurality of elevation beams 600, in accordance with some embodiments of the invention. In this embodiment, the wireless antenna array assembly 200 is configured to provide elevation beam coverage across 180 degrees. In another embodiment, the wireless antenna array assembly 200 is configured to provide less than 180 degree elevation beam coverage, though the embodiment is not so limited. The wireless antenna array assembly 200 comprises complementary antenna types to provide azimuth and elevation coverage.

An amount of antenna gain will depend on the antenna topologies selection and configuration. For wavelengths in a 60 GHz band, the antennas are a few millimeters in size single antenna gain for mm-wave applications may range between 3-18 dBi based on antenna type selection and configuration. Achieving more than 10-15 dBi antenna gain is necessary for practical WPAN-type applications. A single antenna or antenna arrays and/or stacks can be fabricated on and/or attached to the substrates to provide higher gain values. As an example, between 4 and 16 high-gain endfire antennas may be arranged upon a third substrate 240 to provide desired azimuth beam coverage across 360 degrees.

Figure 7:
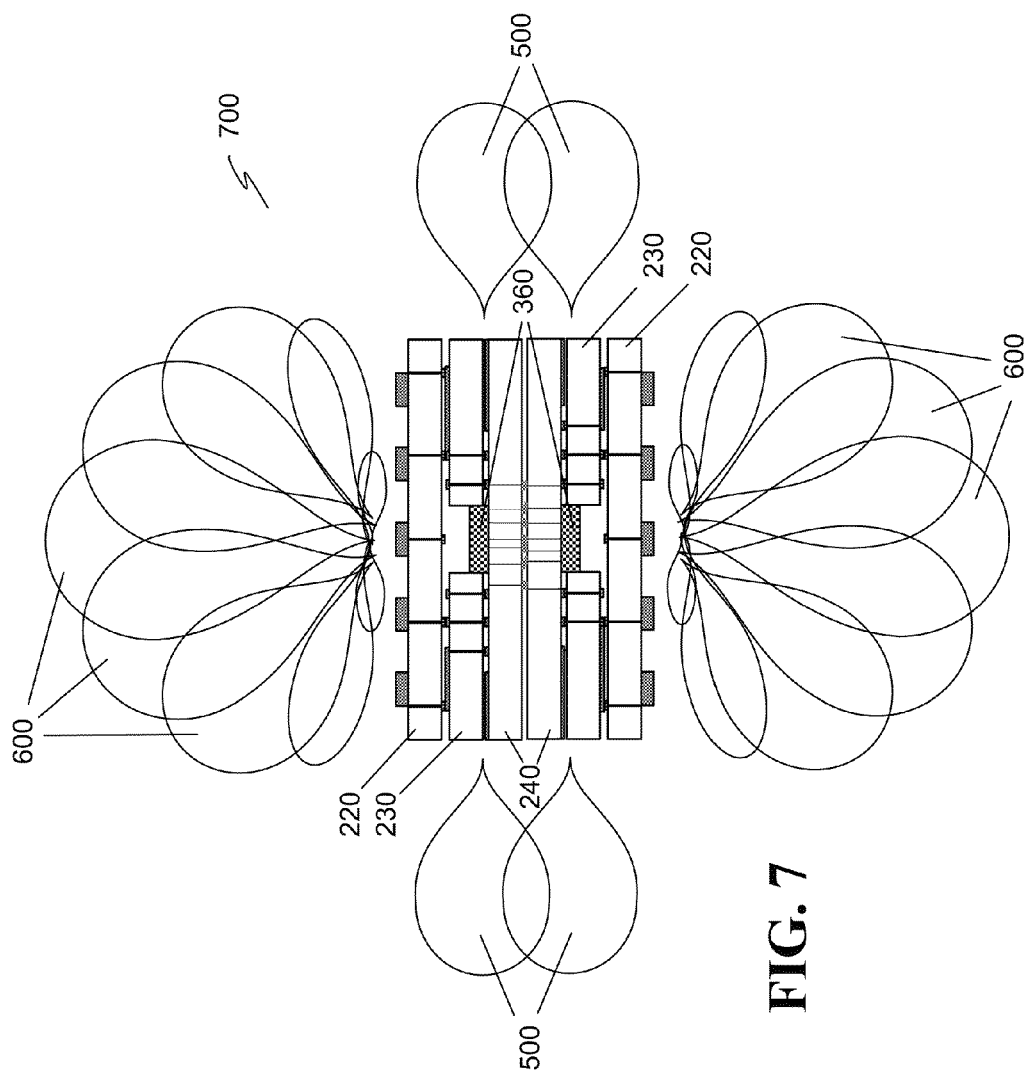
FIG. 7 is an illustration of elevation and azimuth beam coverage of a top and bottom wireless antenna array assembly in accordance with some embodiments of the present invention.

FIG. 7 is an illustration of elevation and azimuth beam coverage of a top and bottom wireless antenna array assembly 700 in accordance with some embodiments of the present invention. The top and bottom wireless antenna array assembly 700 in this embodiment is comprised of two wireless antenna array assemblies 200 configured to provide complete 360 degree azimuth coverage as well as complete 360 degree elevation coverage. In one embodiment, the top and bottom wireless antenna array assembly 700 is an omnidirectional antenna to provide omnidirectional beam coverage over a distance of 10 meters (m).

While specific embodiments of, and examples for, the invention are described herein for illustrative purposes, various equivalent modifications are possible within the scope of the invention, as those skilled in the relevant art will recognize. In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Modifications may be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A millimeter-wave (mm-wave) communications device, comprising:
    a first mm-wave antenna on a substrate, wherein the first mm-wave antenna is configured to provide an elevation coverage:
    a second mm-wave antenna on another substrate, wherein the second mm-wave antenna is configured to provide an azimuth coverage;
    an interface structure configured to provide an interconnect routing between the said substrates through a via;
    an integrated circuit that is disposed in the other substrate that includes the second mm-wave antenna, wherein the integrated circuit is connected to the first and second mm-wave antennas through the via and a microfeed line, respectively, wherein the integrated circuit is configured to communicate using mm-wave signals.

2. The millimeter-wave communications device of claim 1, wherein the first mm-wave antenna is a planar antenna.

3. The millimeter-wave communications device of claim 2, wherein the second mm-wave antenna is an endfire antenna.

4. The millimeter-wave communications device of claim 1, further including a plurality of first mm-wave antennas on the substrate and a plurality of second mm-wave antennas on the another substrate.

5. The millimeter-wave communications device of claim 1, wherein the millimeter-wave communications device is an omnidirectional antenna.

6. The millimeter-wave communications device of claim 1, wherein the substrates comprise Low Temperature Co-fired Ceramic antenna grade core material.

7. An apparatus for 60 GHz band wireless communication, comprising:
    a planar antenna on a first substrate and an endfire antenna on a third substrate, wherein the planar antenna is connected to an integrated circuit through an interconnect in a second substrate to carry a millimeter wave (mm-wave) signal from the planar antenna to the integrated circuit.

8. The apparatus of claim 7, wherein the endfire antenna is selected from the group consisting of a quasi-Yagi-Uda antenna, slot antenna, Vivaldi antenna, dipole antenna, and low-profile-horn antenna.

9. The apparatus of claim 7, wherein the planar antenna is selected from the group consisting of a patch antenna, slot antenna, spiral antenna, monopole antenna, and a dipole antenna.

10. The apparatus of claim 7, further including a plurality of planar antennas on the first substrate and a plurality of endfire antennas on the third substrate.

11. The apparatus of claim 7, wherein the endfire antenna is connected to the integrated circuit through a microfeed line.

12. The apparatus of claim 7, wherein the apparatus is an omnidirectional antenna.

13. A multipoint wireless communications device, comprising:
    a plurality of planar antennas configured to operate in a 60 GHz band;
    a plurality of endfire antennas configured to operate in the 60 GHz band;
    an integrated circuit connected to the plurality of planar antennas through a number of vias and to the plurality of endfire antenna through a number of microfeed lines, wherein the plurality of planar and endfire antennas provide an omnidirectional antenna array.

14. The multipoint wireless communications device of claim 13, wherein the plurality of endfire antennas is selected from the group consisting of a quasi-Yagi-Uda antenna, slot antenna, Vivaldi antenna, dipole antenna, and a low-profile-horn antenna.

15. The multipoint wireless communications device of claim 13, wherein the plurality of planar antennas is selected from the group consisting of a patch antenna, slot antenna, spiral antenna, monopole antenna, and a dipole antenna.

16. The multipoint wireless communications device of claim 13, wherein the integrated circuit comprises a transceiver to process millimeter-wave signals.

17. The multipoint wireless communications device of claim 13, wherein the antennas are situated on substrates comprising antenna grade core material.

18. The multipoint wireless communications device of claim 13, wherein the endfire antennas are configured to provide an azimuth coverage.

19. A multipoint wireless communications device, comprising:
    a plurality of planar antennas configured to operate in a 60 GHz band;
    a plurality of endfire antennas configured to operate in the 60 GHz band;
    an integrated circuit connected to the plurality of planar antennas through a number of vias to provide an omnidirectional antenna array; and a second integrated circuit.

20. A multipoint wireless communications device, comprising:
    a plurality of planar antennas configured to operate in a 60 GHz band;
    a plurality of endfire antennas configured to operate in the 60 GHz band;
    an integrated circuit connected to the plurality of planar antennas through a number of vias that provide routing using shielded stripline transmission structures.

* * * * *